US010746400B2

(12) United States Patent
Johnson et al.

(10) Patent No.: US 10,746,400 B2
(45) Date of Patent: Aug. 18, 2020

(54) INTEGRATED FLARE COMBUSTION CONTROL

(71) Applicant: General Electric Company, Schenectady, NY (US)

(72) Inventors: Daniel Robert Johnson, Methuen, MA (US); Chong Tao, Winchester, MA (US); Joshua Daniel Brooks, Houston, TX (US); Randy Scott Pfenninger, Groton, MA (US); Lei Sui, Winchester, MA (US)

(73) Assignee: General Electric Company, Schenectady, NY (US)

( * ) Notice: Subject to any disclaimer, the term of this patent is extended or adjusted under 35 U.S.C. 154(b) by 333 days.

(21) Appl. No.: 15/633,204

(22) Filed: Jun. 26, 2017

(65) Prior Publication Data
US 2017/0370579 A1    Dec. 28, 2017

Related U.S. Application Data

(60) Provisional application No. 62/355,744, filed on Jun. 28, 2016.

(51) Int. Cl.
*G05B 11/00* (2006.01)
*F23G 5/50* (2006.01)
(Continued)

(52) U.S. Cl.
CPC ............... *F23G 5/50* (2013.01); *F23G 7/065* (2013.01); *F23G 7/085* (2013.01); *F23N 1/002* (2013.01);
(Continued)

(58) Field of Classification Search
CPC ... G05B 13/021; G05B 23/0221; G05B 15/00
(Continued)

(56) References Cited

U.S. PATENT DOCUMENTS 3,891,847 A    6/1975    Schmidt et al.
4,139,339 A    2/1979    Straitz, III
(Continued)

FOREIGN PATENT DOCUMENTS

WO    2014128132 A1    8/2014
WO    2015160494 A1    10/2015

OTHER PUBLICATIONS

International Search Report and Written Opinion, dated Sep. 20, 2017, for co-pending International application No. PCT/US2017/039540 (15 pgs.).

*Primary Examiner* — Natalia Levkovich
(74) *Attorney, Agent, or Firm* — Mintz Levin Cohn Ferris Glovsky and Popeo, P.C.

(57) ABSTRACT

A system for flare combustion control includes a sound speed measurement device for measuring sound speed in a flare vent gas, and a flare combustion controller including a memory and a processor. The processor is configured to receive the measured sound speed and determine, based on the measured sound speed, a molecular weight of the flare vent gas. The processor is further configured to determine, based on the determined molecular weight, a net heating value of the flare vent gas, and adjust the net heating value of the flare vent gas by regulating an amount of a supplemental fuel gas in the flare vent gas.

5 Claims, 6 Drawing Sheets

(51) Int. Cl.
*F23N 1/00* (2006.01)
*F23N 5/00* (2006.01)
*F23G 7/06* (2006.01)
*F23G 7/08* (2006.01)
*G05B 19/418* (2006.01)

(52) U.S. Cl.
CPC ........... *F23N 5/003* (2013.01); *G05B 19/418* (2013.01); *F23G 2207/10* (2013.01); *F23G 2207/112* (2013.01); *F23N 2225/00* (2020.01); *G05B 2219/41108* (2013.01)

(58) Field of Classification Search
USPC ................................................. 700/274, 266
See application file for complete search history.

(56) References Cited

U.S. PATENT DOCUMENTS

| | | | |
|---|---|---|---|
| 4,229,157 | A | 10/1980 | Ito et al. |
| 6,216,091 | B1 | 4/2001 | Hammond |
| 8,138,927 | B2 | 3/2012 | Diepenbroek et al. |
| 8,629,313 | B2 | 1/2014 | Hong et al. |
| 9,423,126 | B1 | 8/2016 | Archer et al. |
| 9,568,192 | B1 | 2/2017 | Archer et al. |
| 9,594,359 | B2 | 3/2017 | Mohideen et al. |
| 2008/0134751 | A1* | 6/2008 | Huang .................... G01F 1/667 73/23.2 |
| 2009/0035709 | A1 | 2/2009 | Mennie et al. |
| 2011/0126545 | A1 | 6/2011 | Loeven, II |
| 2011/0195364 | A1 | 8/2011 | Tullos |
| 2012/0015308 | A1 | 1/2012 | Hong et al. |
| 2015/0260397 | A1 | 9/2015 | Talasila et al. |

* cited by examiner

INTEGRATED FLARE COMBUSTION CONTROL

CROSS REFERENCE TO RELATED APPLICATIONS

This application claims the benefit of and priority to U.S. Provisional Patent Application Ser. No. 62/355,744 filed Jun. 28, 2016, entitled "INTEGRATED FLARE COMBUSTION CONTROL SYSTEM AND METHODS", the disclosure of which is hereby incorporated by reference in its entirety.

BACKGROUND

The field of the present disclosure relates generally to gas flare operations and more specifically, to methods and systems for controlling the operating parameters of a gas flare used in industrial plants to burn flammable gasses.

At least some known flare control systems use a gas chromatograph (GC) to determine a flare gas composition and calculate a BTU value of the flare gas. This method does not directly measure a heating value of the flare gas, but rather speciates the sample and determines the heating value by summing the products of each components' heating value and the molecular fraction of each component. The GC, however, is not a continuous measuring instrument and has a slow response time that can take many minutes for a BTU determination for each gas sample. In addition, the data received from the GC is many minutes old, and, as is common in flare systems, the composition of a flare vent gas can be subject to fast fluctuations and variances.

At least some other known flare control systems use a calorimeter to calculate a BTU value of the flare gas. A calorimeter mixes and burns a sample of the flare gas with air or another fuel. At least some known calorimeters regulate the flow of air to maintain a constant exhaust temperature. The air flow variation provides an input that can be used to calculate a heating value of the flare gas. Some other calorimeters measure excess oxygen content after combustion of the flare gas sample. The residual oxygen content provides an input that can be used to calculate a heating value of the flare gas. Such calorimeters, however, can have a response time greater than one minute or more for a BTU determination for each gas sample. In addition, a calorimeter cannot speciate the gas sample, and therefore, there is still a need to have a GC installed in order to determine a total hydrocarbon content and/or a molecular weight of the flare vent gas.

BRIEF DESCRIPTION

In one aspect, a flare combustion control system is provided. The flare combustion control system includes a sound speed measurement device for measuring sound speed in a flare vent gas. In addition, the control system includes a flare combustion controller having a memory and a processor. The processor is configured to receive the measured sound speed from the sound speed measurement device. In addition, the processor is configured to determine, based on the measured sound speed, a molecular weight of the flare vent gas. The processor is further configured to determine, based on the determined molecular weight, a net heating value of the flare vent gas, and adjust the net heating value of the flare vent gas by regulating an amount of a supplemental fuel gas in the flare vent gas.

In another aspect, a method for maintaining a minimum net heating value in a combustion zone of a flare tip is provided. The method includes determining a sound speed of a flare vent gas, and determining, based on the determined sound speed, a net heating value of the flare vent gas. The method also includes adjusting the net heating value of the flare vent gas by regulating an amount of a supplemental fuel gas in the flare vent gas.

In another aspect, a method for smokeless combustion of a flare vent gas is provided. The method includes measuring a sound speed of the flare vent gas and determining, based on the measured sound speed, the molecular weight of the flare vent gas. The method also includes calculating, based on the determined molecular weight, an amount of an assist gas to achieve smokeless combustion of the flare vent gas, and regulating a flow of the assist gas for mixing with the flare vent gas to produce smokeless combustion of the flare vent gas.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
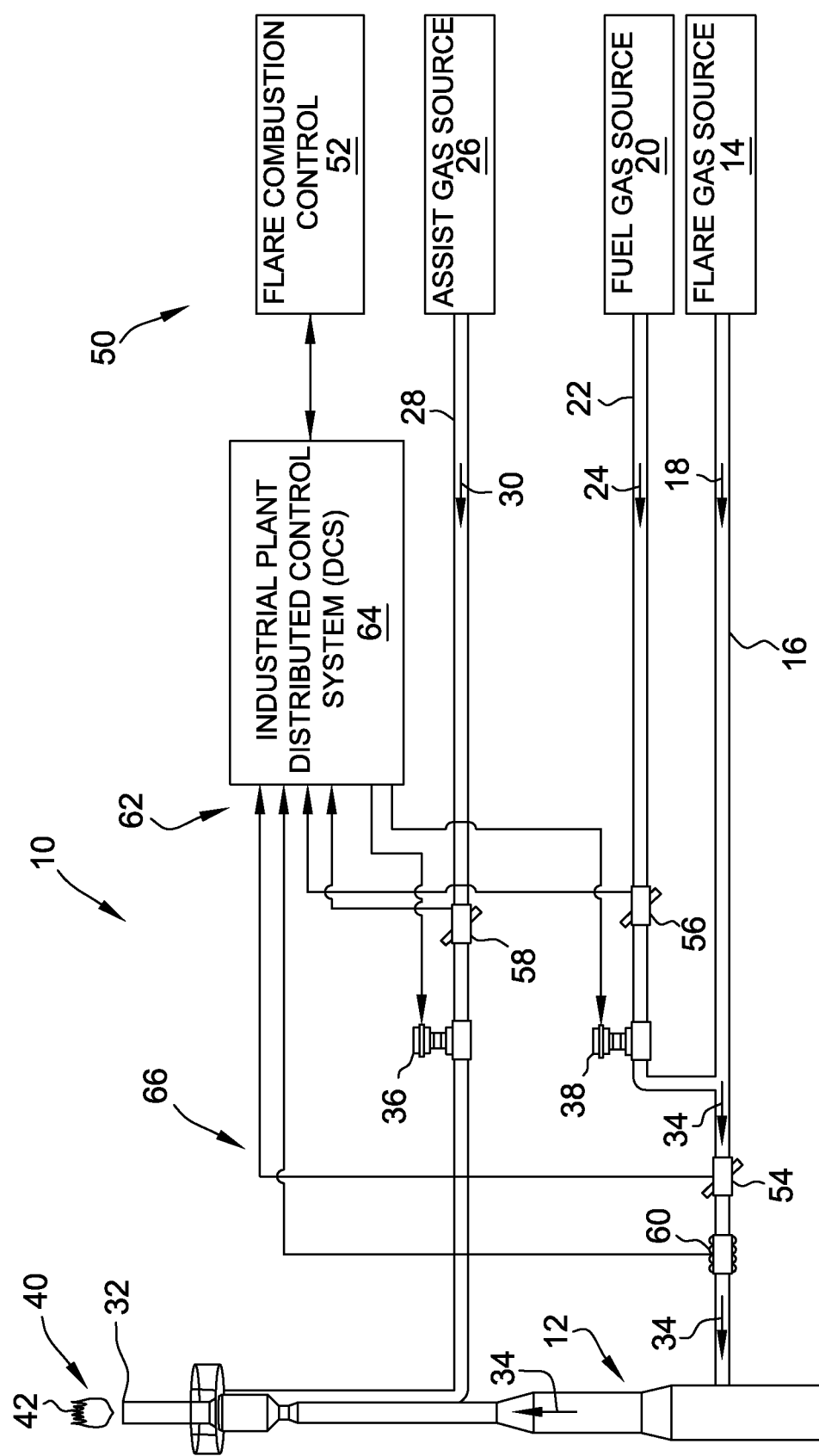
FIG. 1 is a schematic view of an exemplary industrial plant.

Unless otherwise indicated, the drawings provided herein are meant to illustrate features of embodiments of the disclosure. These features are believed to be applicable in a wide variety of systems comprising at least one embodiment of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the disclosure can provide techniques for optimizing the operation of a flare stack in an industrial plant. Industrial plants such as oil platforms and refineries often use a gas flare to burn off excess flammable gasses such as excess gas resulting from plant startup, shutdown, and emergency situations. Along with the excess gasses being burned off, other elements such as fuel gas, steam, and/or air can be provided to the flare stack to help control the burn. It can be desirable to adjust the ratios of the various ingredients provided to the flare using a control system to optimize the burning of the flare. In some embodiments disclosed herein, the control system includes an ultrasonic measurement system for measuring the various ingredients provided to the flare such as the flare gas, steam, air and/or fuel gas. The ultrasonic measurement system can be used as part of a two-stage "coarse" and "fine" tuning operation of the flare stack. Other embodiments are within the scope of the disclosure.

In particular, embodiments of the disclosure provide a control system for maintaining a minimum net heating value (NHV) in a combustion zone of the flare, enhancing assist gas (e.g., steam) flow to the flare for a smokeless operation at the flare tip, and maintaining a limit on tip velocity as a function of the NHV. Embodiments of the ultrasonic measurement system can provide an accurate and repeatable flow measurement of the flare gas derived from the sound speed of the measured stream. The sound speed can be estimated using an ultrasonic flowmeter, although other techniques are possible. The sound speed, in combination with a temperature and pressure of the stream, can provide an average molecular weight of an unknown hydrocarbon mixture. This information can be used by the control system to determine the net heating value, or British thermal unit (BTU) content of the unknown hydrocarbon mixture, which can be used for a coarse tuning of the operation of the flare to provide for more efficient flare operation. In addition to the coarse BTU determination, the control system can also provide a correlation between BTU content and steam and/or air flow requirements to facilitate maintaining smokeless operation of the flare.

FIG. 1 is a schematic view of an exemplary industrial plant 10. As shown in the exemplary embodiment, industrial plant 10 can include a flare stack 12 configured for burning, or flaring, flammable gases discharged by industrial plant 10. A flare gas (e.g. waste gas) source 14 can be coupled to flare stack 12 via a flare gas conduit 16 for introducing a flare gas flow 18 into flare stack 12. Industrial plant 10 can also include a fuel gas source 20 for supplementing flare gas flow 18. Fuel gas source 20 can be coupled to flare gas conduit 16 via a supplemental fuel gas conduit 22 for introducing a supplemental fuel gas flow 24 into flare gas flow 18. In the exemplary embodiment, flare gas flow 18 or a mixture of flare gas flow 18 and supplemental fuel gas flow 24 flowing through flare stack 12 is referred to as a flare vent gas, generally indicated at 34.

As shown in the exemplary embodiment, an assist gas source 26 can also be coupled to flare stack 12 proximate an open end, or flare tip 32, of flare stack 12. Assist gas source 26, such as but not limited to a steam source, can be coupled to flare stack 12 via an assist gas conduit 28 for introducing an assist gas flow 30 to flare gas flow 18 and/or supplemental fuel gas flow 24 proximate flare tip 32 to facilitate smokeless flaring. In the exemplary embodiment, assist gas flow 30 is a flow of steam and/or air. Alternatively, assist gas 30 is a substantially dry flow of air.

Furthermore, as shown in the exemplary embodiment, assist gas conduit 28 can include an assist gas control valve 36 coupled in line with the conduit for controlling an amount of assist gas flow 30 to flare stack 12. In addition, supplemental fuel gas conduit 22 can include a supplemental fuel gas control valve 38 coupled in line with the conduit for controlling an amount of supplemental fuel gas flow 24 into flare gas flow 18. Supplemental fuel gas flow 24 may be provided to facilitate increasing a heating value of flare gas flow 18 and for use as a purge gas to facilitate preventing air from entering flare stack 12 through flare tip 32. Also, assist gas flow 30 may be provided to flare stack 12 to facilitate smokeless flaring and reducing a heating value of flare vent gas 34 and to facilitate protecting flare tip 32 from overheating and damaging the tip.

As shown in the exemplary embodiment, industrial plant 10 can also include a flare combustion control system 50. It should be noted that flare combustion control system 50 described herein is not limited to the particular flare control aspects described herein. One of ordinary skill in the art will appreciate that flare combustion control system 50, as described herein, may be used to control all operational aspects of flare stack 12, including for example, flare-related systems of industrial plant 10, in any suitable configuration that enables flare combustion control system 50 to operate as further described herein. In the exemplary embodiment, flare combustion control system 50 can be further configured to maintain a minimum NHV in a combustion zone 40 of flare stack 12, enhance an amount of assist gas flow 30 to flare stack 12 for smokeless operation at flare tip 32, and maintain a limit on tip velocity as a function of the NHV. Flare combustion control system 50 can include a flare combustion controller 52 coupled in communication to an industrial plant distributed control system (DCS) 62. DCS 62 includes at least one computing device 64 and a communication network 66 for coupling to operable system devices (e.g., assist gas control valve 36, supplemental fuel gas control valve 38, and energy measuring device 60). Communication network 66 connections take many forms including, for example, direct wired connections between each system device and computing device 64, for example, over a bus network, or system devices wirelessly transmitting data to computing device 64. In the exemplary embodiment, communication network 66 can be an interface for both sending control commands to the individual system devices in industrial plant 10, and retrieving data from the system devices themselves (e.g., assist gas control valve 36, supplemental fuel gas control valve 38, and energy measuring device 60).

Furthermore, in the exemplary embodiment, DCS 62 can be coupled to an energy measuring device 60 configured to measure one or more properties of flare vent gas 34. In an alternative embodiment, energy measuring device 60 can be coupled to flare combustion controller 52. In the exemplary embodiment, energy measuring device 60 can be configured to measure one or more specific characteristics of flare vent gas 34, for example and without limitation, a NHV, a lower flammability limit, a total hydrocarbon content (THC), and a molecular weight of flare vent gas 34. Energy measuring device 60 may be, for example, a gas chromatograph (GC), a calorimeter, or any other device that can measure the specific characteristics of flare vent gas 34, as described herein.

In some embodiments, a GC can be configured to determine a composition of flare vent gas 34 and calculate a BTU value of the flare gas. To determine a heating value of flare vent gas 34, the GC can speciate the sample and determine the BTU value by summing the products of each component's BTU value and the molecular fraction of each component. The GC, however, is not a continuous measuring instrument and has a slow response time that can take as long as twenty minutes or more for a BTU determination for each gas sample. In other embodiments, a calorimeter may mix and burn a sample of flare vent gas 34 with air or another fuel. The calorimeter may regulate the flow of air to maintain a constant exhaust temperature. The airflow variation provides an input that can be used to calculate a heating value of the flare gas. Alternatively, the calorimeter may measure excess oxygen content after combustion of the flare gas sample. The residual oxygen content can provide an input that can be used to calculate a heating value of the flare gas. The calorimeter, however, can have a response time greater than one minute or more for a BTU determination for each gas sample. In addition, the calorimeter cannot speciate the gas sample, and therefore, there is still a need to have a GC installed in order to determine a THC content and/or a molecular weight of flare vent gas 34. In addition, the calorimeter may also require regular calibration and if the gases comprising flare vent gas 34 vary, then the calorimeter would need to be calibrated with each of such gases.

As shown in the exemplary embodiment, DCS 62 can be coupled to a flare vent gas flowmeter 54, a supplemental fuel gas flowmeter 56, and an assist gas flowmeter 58. In addition, DCS 62 can be coupled in communication to assist gas control valve 36 and supplemental fuel gas control valve 38 to facilitate adjusting assist gas flow 30 and supplemental fuel gas flow 24, respectively. Adjusting assist gas control valve 36 and supplemental fuel gas control valve 38 can facilitate controlling the operating parameters of a flare 42 of flare stack 12.

In the exemplary embodiment, flare vent gas flowmeter 54 can be a sound speed measurement sensor system that performs a signal path measurement by directing sound waves (e.g., ultrasonic waves) through flare vent gas 34, and processes the detected sound waves to determine sound speed and to derive the average molecular weight of an unknown hydrocarbon mixture present in flare vent gas 34. Flare vent gas flowmeter 54 may include, for example and without limitation, a time-of-flight sensor, a phase difference sensor, and the like.

Flare combustion controller 52 can receive, via DCS 62, sound speed data from flare vent gas flowmeter 54, pressure, and temperature information of flare vent gas 34, and can perform an iterative procedure to match a hypothetical composition or average molecular weight to the observed sound speed. Flare combustion controller 52 can store a number of tables in which the critical pressure, compressibility, acentric factor, and heat capacity of hydrocarbon gas have been tabulated as functions of molecular weight. Flare combustion controller 52 can execute a programmed set of calculations for determining the sound speed of a mixture of gases by using the virial equations, and can determine the virial coefficients from these four properties of flare vent gas 34. For example and without limitation, flare combustion controller 52 can estimate the molecular weight of the hydrocarbon component of flare vent gas 34, and perform a sequence of estimates and calculations to result in a predicted sound speed, which is checked against the measured sound speed received from flare vent gas flowmeter 54. If different, flare combustion controller 52 can set the next molecular weight estimate, and check its effect on predicted speed, until these converge to the average molecular weight of the hydrocarbon components present in flare vent gas 34. Thus, flare vent gas flowmeter 54 can accurately determine the average molecular weight of component gases of interest present in flare vent gas 34 using only parameters such as temperature, pressure, and sound speed that are directly and readily measured by sound wave interrogation or using simple sensors. In addition, usage of the virial equations with flare vent gas flowmeter 54 can yield the compressibility factor of flare vent gas 34. This parameter is important for determining mass flow of flare vent gas 34.

In the exemplary embodiment, supplemental fuel gas flowmeter 56 and assist gas flowmeter 58 can also be sound speed measurement sensor systems. Alternatively, supplemental fuel gas flowmeter 56 and assist gas flowmeter 58 can be any type of mass flow sensors that enable industrial plant 10 to operate as described herein.

FIGS. 2-5 are flow charts of exemplary methods for controlling flow rates of fuel gas flow 24, assist gas flow 30, and flare vent gas 34 to facilitate controlling the operating parameters of flare 42 of flare stack 12. The U.S. Environmental Protection Agency (EPA) has issued regulations for the operating and monitoring requirements for flares at industrial plants, for example, flare 42 of flare stack 12. The general provisions of the regulations specify that flares shall be operated at all times when emissions may be vented to them, and must be operated with no visible emissions except for periods not to exceed five minutes during any consecutive two (2) hour period). In addition, the regulations specify that a flare must be operated with a minimum heat content requirement and tip velocity based on the type of flare. The regulations include combustion zone operating limits for flares, including requirements to ensure that the combustible material present is sufficient to ensure adequate combustion of the gas mixture. The three flare combustion zone operational limits include net heating value (Btu/scf), lower flammability limit, and total combustible fraction. To demonstrate continuous compliance with each of the three operating limits discussed above, industrial plant 10, for example, needs to monitor flow rate $Q_{flare}$ of flare vent gas 34, flow rate $Q_{assist}$ of assist gas flow 30, and specific characteristics of flare vent gas 34 (e.g., heat content and composition). The regulations specify that the industrial plant would be required to calculate 15-minute block data on a cumulative basis using the monitored parameters.

As discussed above, an industrial plant may use a calorimeter to monitor vent gas net heating value. This would limit, however, the plant to demonstrating compliance only with the net heating value operating limit. In addition, an industrial plant may use a device that monitors the total hydrocarbon content (THC) of the vent gas. However, use of such a device would limit the plant to demonstrating compliance only with the combustibles concentration operating limit. To demonstrate compliance with all three operating limits, the EPA suggests that the use of an on-line gas chromatograph (GC) will provide sufficient flexibility to determine compliance with all of the three combustion zone operating limits. However, as discussed above, the GC is not a continuous measuring instrument and has a slow response time for determining a BTU determination for each gas sample. In industrial plants, e.g., industrial plant 10, the composition of flare vent gas 34 can be subject to certain fast fluctuations and variances. When the gases present under these measurement conditions are used in bulk processes involving hydrocarbons, the monetary value of material flowing in the conduit can be substantial, and it is necessary to know its volume and composition with relatively high accuracy for processing, control, and environmental reasons, as described herein.

Flare combustion controller 52, as described herein, can provide a fully integrated flare combustion control system that can facilitate maintaining operational compliance with all three operating limits during periods between the EPA required 15-minute intervals or other measurement intervals of energy measurement device 60 when the composition of flare vent gas 34 can be subject to fast fluctuations and variances. As described herein, the BTU calculations of energy measurement device 60 are referred to as fine tuning of the operation of flare 42 of flare stack 12, and the measurement intervals of energy measurement device 60 are referred to as "fine tuning" intervals. The sound speed measurements of flare vent gas flowmeter 54 and control of the operating limits of flare 42 based on the sound speed measurements is referred to as coarse tuning of the operation of flare 42. Coarse tuning intervals are determined by a plant operator and can include update periods of, for example and without limitation, 2 minutes, 1 minute, 30 seconds, 15 seconds, and continuous updates.

Figure 2:
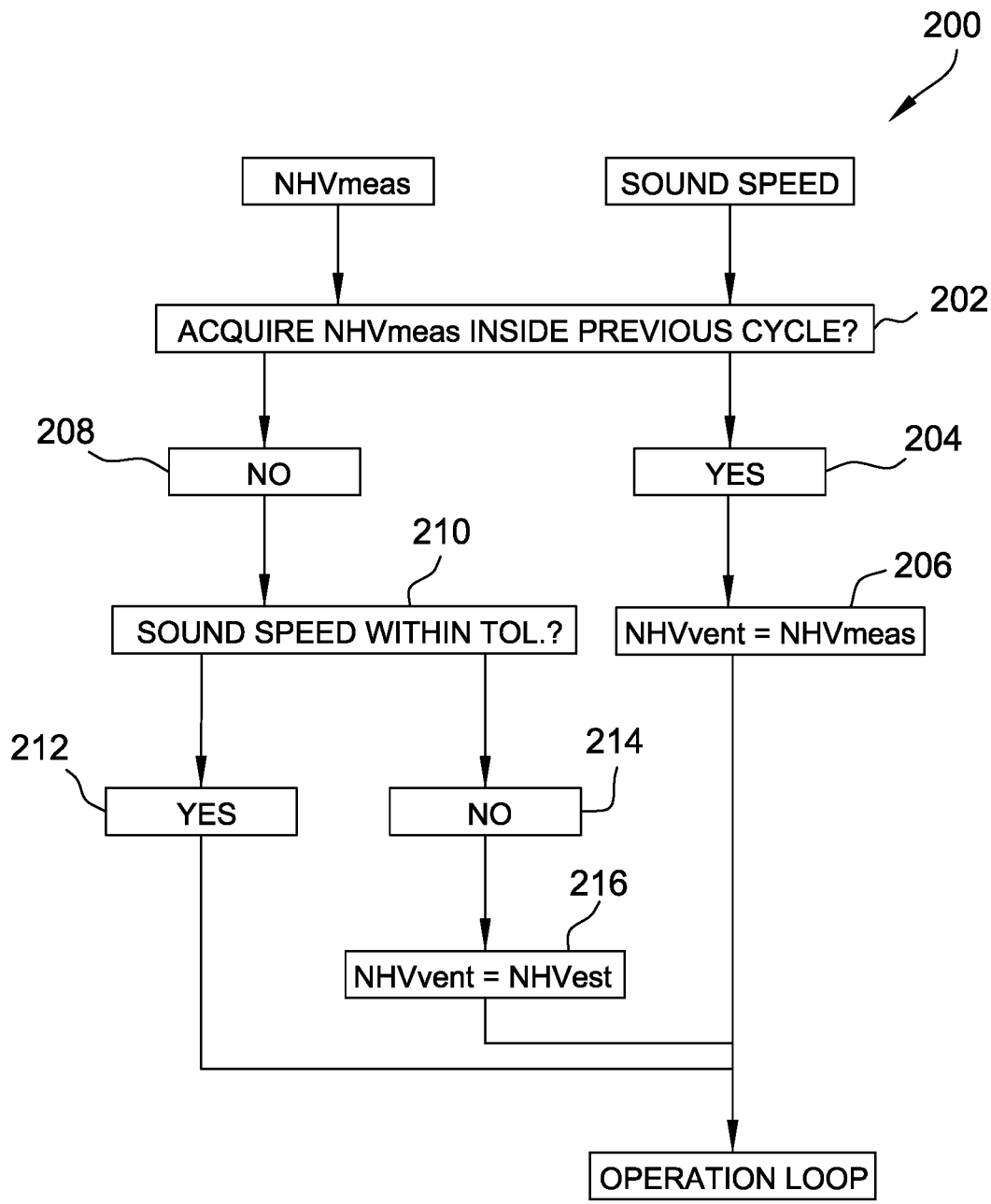
FIG. 2 is a flow chart of an exemplary variable initialization loop for determining a net heating value of a flare vent gas for a respective operational loop of a flare combustion controller of FIG. 1.

FIG. 2 is a flow chart of an exemplary variable initialization loop 200 for determining a net heating value (NHV-vent) of flare vent gas 34 for a respective operational loop of the flare combustion controller 52. In the exemplary embodiment, flare combustion controller 52 can receive a measured net heating value (NHVmeas) from energy measurement device 60 (e.g., a GC) and/or a sound speed of the flare vent gas 34 from the flare vent gas flowmeter 54. The NHVmeas and the sound speed can be input into variable initialization loop 200. Flare combustion controller 52 can determine 202 whether the NHVmeas value was acquired inside the previous cycle of flare combustion controller 52. If the NHVmeas value was acquired in the previous cycle 204, the flare combustion controller 52 can set the NHVvent value equal to the NHVmeas value 206. This represents a fine tuning operation of the flare combustion controller 52, i.e., the use of a BTU value determined by energy measuring device 60.

In the exemplary embodiment, if flare combustion controller 52 determines that the NHVmeas value was not acquired inside the previous cycle 208, flare combustion controller 52 can use the measured sound speed of flare vent gas 34. This represents a coarse tuning of the flare combustion controller 52, i.e., the use of a "coarse" BTU value calculated from the sound speed. The measured sound speed can be compared to the sound speed measured in the previous cycle of flare combustion controller 52 to determine if the current sound speed falls within a predetermined tolerance range of the previous sound speed 210. If it does, then flare combustion controller 52 can set the NHVvent value based on the measured sound speed 212. If, however, the measured sound speed in not within the predetermined tolerance range 214, flare combustion controller 52 can set the NHVvent value equal to an estimated NHV (NHVest) 216. NHVest is determined by flare combustion controller 52 from a data model that includes previously saved NHVmeas and sound speed data. Flare combustion controller 52 can choose an NHVest value from the data model that corresponds to the received NHVmeas and sound speed data. The NHVvent value can then be then used by flare combustion controller 52 as an input for further control of flare stack 12.

Figure 3:
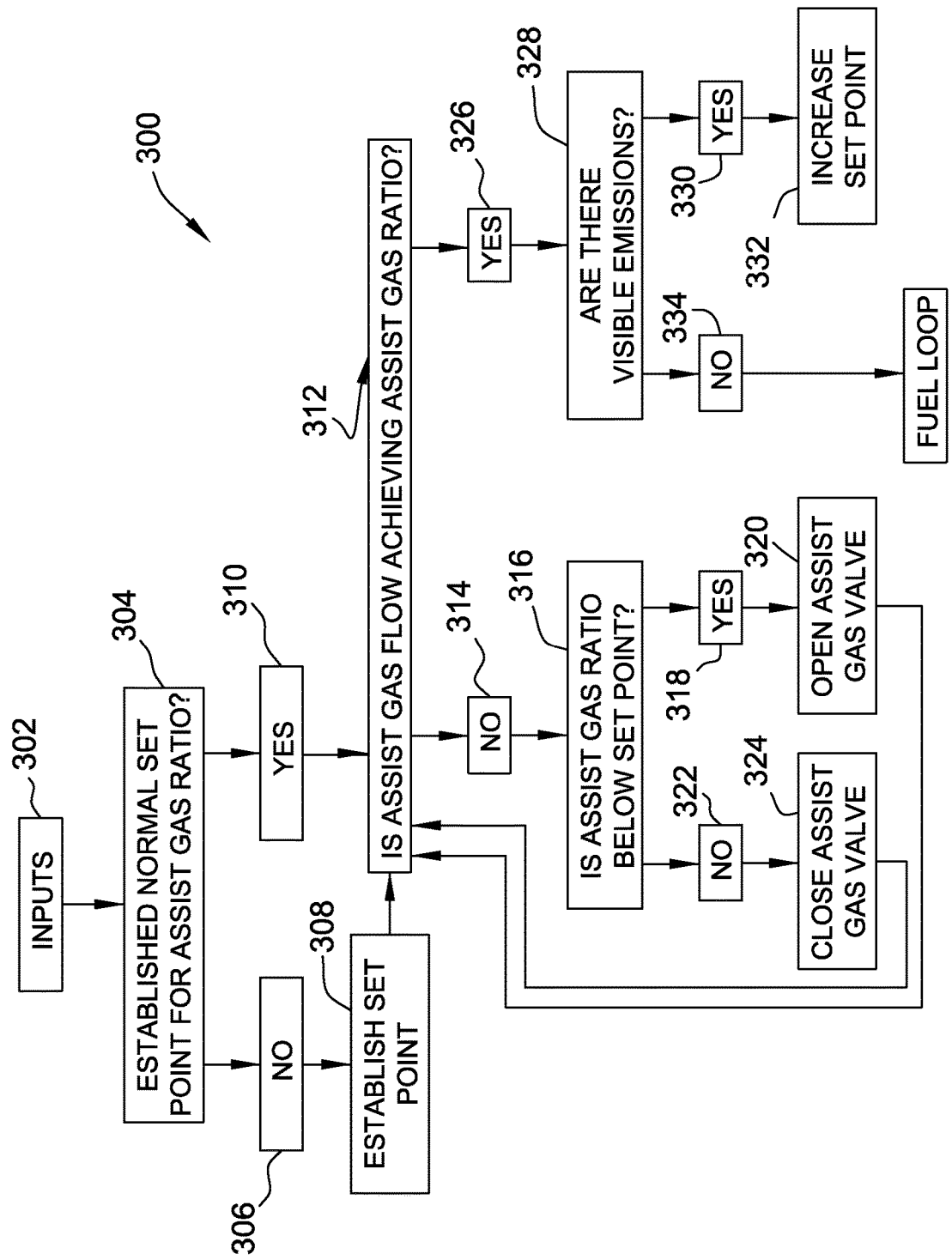
FIG. 3 is a flow chart of an exemplary assist gas loop for determining an assist gas ratio for a flare vent gas for a respective operational loop of the flare combustion controller of FIG. 1.

FIG. 3 is a flow chart of an exemplary assist gas loop 300 for determining an assist gas ratio for flare vent gas 34 for a respective operational loop of the flare combustion controller 52. In the exemplary embodiment, flare combustion controller 52 can receive 302 inputs, including flow rate $Q_{assist}$ of assist gas flow 30, flow rate $Q_{fuel}$ of fuel gas flow 24, flow rate $Q_{flare}$ of flare vent gas 34, assist gas valve position, fuel valve position, and NHVvent. Flare combustion controller 52 can determine 304 whether there is an established normal set point for an assist gas ratio. If no 306, then flare combustion controller 52 can establish 308 a set point and proceed to step 312. For example, the American Petroleum Institute (API) has a model to facilitate determining a steam ratio for a flare based on several operating conditions. Steam can be used as assist gas flow 30 to promote combustion of flare vent gas 34. Incomplete combustion may cause incandescence and eventually, black smoke due to solid carbon particles. Both are pollutants and should be avoided, where possible. Too much assist gas can cause poor flare operation. Provided that $Q_{flare}$ of flare vent gas 34 is measured, the required assist gas ratio can be maintained throughout the required flare operating range.

In the exemplary embodiment, if the normal set point is established for the assist gas ratio 310, flare combustion controller 52 can determine whether the assist gas flow rate is achieving 312 the assist gas ratio based on the input values described herein. If the assist gas flow is not achieving 314 the assist gas ratio, flare combustion controller 52 can determine whether the assist gas ratio is below the set point 316. If the assist gas ratio is below 318 the set point, flare combustion controller 52 can calculate an amount to open assist gas valve 36 (shown in FIG. 1) and either open 320 the valve 36 by that amount or alert the plant operator to open assist gas valve 36 by that amount. If the assist gas ratio is above 322 the set point, flare combustion controller 52 can calculate an amount to close assist gas valve 36 and either close 324 the valve 36 by that amount or alert the plant operator to close assist gas valve 36 by that amount. Flare combustion controller 52 then can calculate the new assist gas ratio and return to step 312 to determine whether the assist gas flow is achieving the desired assist gas ratio.

If flare combustion controller 52 determines that the assist gas flow is achieving 326 the assist gas ratio, the next step is to determine whether there are visible emissions 328 at the flare stack 12. If there are 330 visible emissions, flare combustion controller 52 can determine an increased set point 332 that facilitates elimination of the visible emissions at flare stack 12. Flare combustion controller 52 then can return to step 312 to determine whether the assist gas flow is achieving the desired assist gas ratio. If there are no 334 visible emissions, then flare combustion controller 52 has determined a satisfactory assist gas flow set point for the current set of input values.

In the exemplary embodiment, flare combustion controller 52 can be a self-training controller, i.e., flare combustion controller 52 can store data regarding assist gas flow set points for the various input values, including the sound speed of flare vent gas 34. After it is determined that there are no 334 visible emissions, the plant operator can store the current data regarding the satisfactory assist gas flow set point for the current set of input values in flare combustion controller 52. The data can include, for example, the flow rate $Q_{flare}$ of flare vent gas 34, the sound speed data, and the assist gas ratio. As data is collected over time, flare combustion controller 52 can build an assist gas ratio model specific to flare stack 12 and industrial plant 10. Thus, flare combustion controller 52 can determine a set point for the assist gas ratio of flare stack 12 based on the input data, thereby forgoing the use of for example, the API steam ratio model. Furthermore, flare combustion controller 52 can use the data collected over time to facilitate determining an assist gas ratio that prevents visible emissions across a wide range of flare vent gas 34 compositions. Therefore, during periods between the EPA required 15-minute intervals or measurement intervals of the GC when the composition of flare vent gas 34 can be subject to fast fluctuations and variances, flare combustion controller 52 can facilitate maintaining emission free operation of flare stack 12 by monitoring and making coarse tuning adjustments to the assist gas flow rate $Q_{assist}$ by opening and/or closing assist gas valve 36, or alerting the plant operator to do the same.

Figure 4:
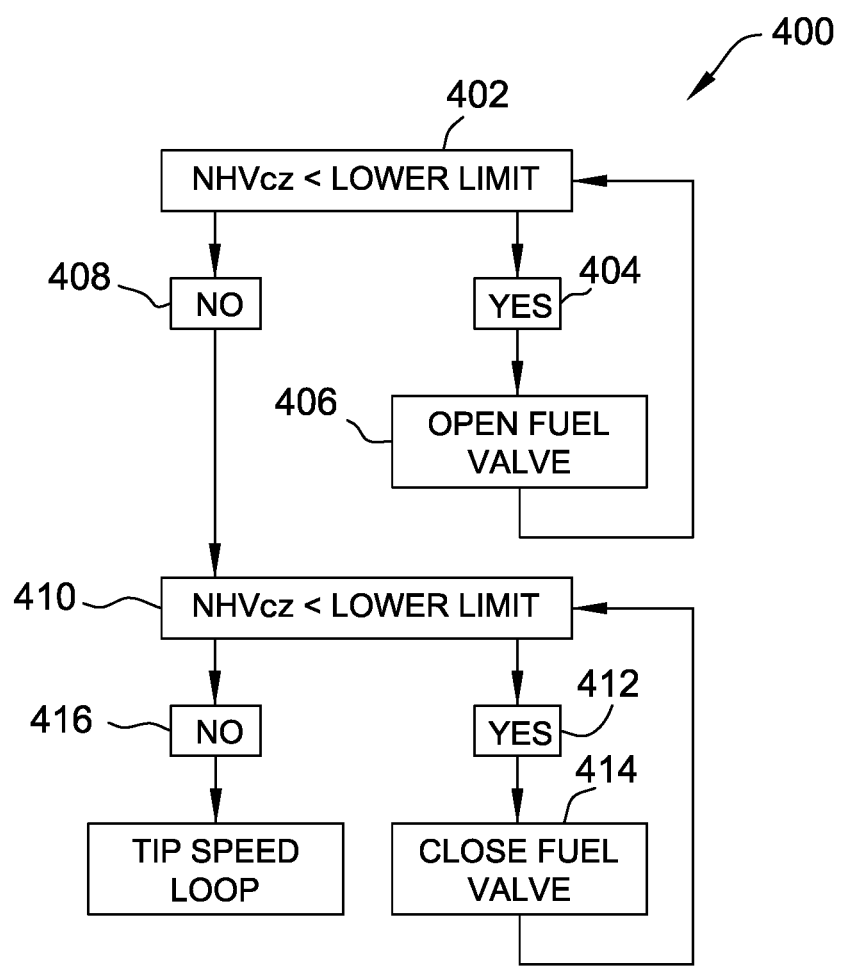
FIG. 4 is a flow chart of an exemplary fuel loop for determining a flow rate of a fuel gas flow for a flare vent gas for a respective operational loop of the flare combustion controller of FIG. 1.

FIG. 4 is a flow chart of an exemplary fuel loop 400 for determining a flow rate $Q_{fuel}$ of supplemental fuel gas flow 24 for flare vent gas 34 for a respective operational loop of the flare combustion controller 52. In the exemplary embodiment, flare combustion controller 52 can determine a net heating value NHVcz of the combustion zone based at least in part on the sound speed of flare vent gas 34 and the flow rate $Q_{fuel}$. At 402, flare combustion controller 52 can determine whether the calculated NHVcz is less than the lower limit (e.g., set by regulation requirements and/or selected by a flare operator) for flare 42 of flare stack 12. If yes 404, flare combustion controller 52 can open 406 fuel valve 38 an amount or instruct the plant operator to do the same. Flare combustion controller 52 can determine a new NHVcz based on the increased flow rate $Q_{fuel}$. If the NHVcz is not 408 less than the lower limit regulation requirements for flare 42 of flare stack 12, flare combustion controller 52 can determine 410 whether the NHVcz is greater than an upper limit set in the regulation requirements.

In the exemplary embodiment, if the NHVcz is greater than 412 the upper limit, flare combustion controller 52 can close 414 fuel valve 38 an amount or instruct the plant operator to do the same. Flare combustion controller 52 can determine a new NHVcz based on the decreased flow rate $Q_{fuel}$. Steps 402 and 410 may be repeated by flare combustion controller 52 until it determines a steady state flow rate for $Q_{fuel}$. If the NHVcz is not 416 greater than the upper limit for flare 42 of flare stack 12, flare combustion controller 52 has determined a satisfactory fuel flow rate $Q_{fuel}$ for the current set of input values.

Figure 5:
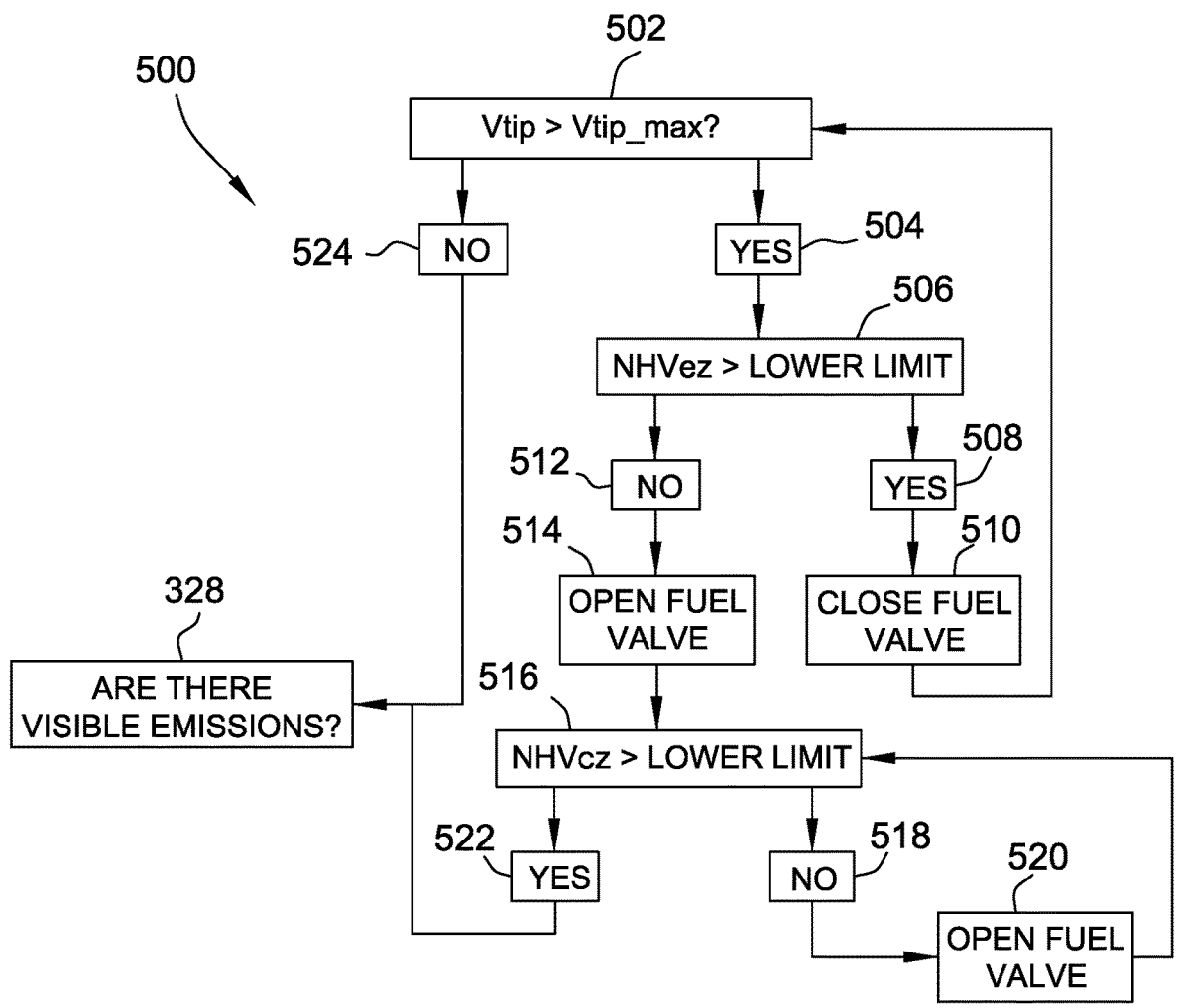
FIG. 5 is a flow chart of an exemplary tip speed loop for determining a tip speed of a flare vent gas for a respective operational loop of the flare combustion controller of FIG. 1.

FIG. 5 is a flow chart of an exemplary tip speed loop 500 for determining a tip speed of flare vent gas 34 for a respective operational loop of the flare combustion controller 52. In the exemplary embodiment, flare combustion controller 52 can determine a maximum tip speed Vtip_max based on the NHVcz and can compare it to the actual tip speed Vtip of the flare stack 12, at 502. If Vtip is less than Vtip_max 524, flare combustion controller 52 can return to step 328 (also shown in FIG. 3) to determine whether there are any visible emissions emitting from flare stack 12. If Vtip is greater than Vtip_max 504, flare combustion controller 52 can determine 506 whether NHVcz is greater than the lower limit set in the regulation requirements. If NHVcz is greater than 508 the lower limit, flare combustion controller 52 can close 510 fuel valve 38 an amount or instruct the plant operator to do the same.

Flare combustion controller 52 can determine a new Vtip_max based on the changed NHVcz and can compare it to the updated actual tip speed Vtip of the flare stack 12 at 502 and repeats the process. If, however, NHVcz is less than 512 the lower limit, flare combustion controller 52 can open 514 fuel valve 38 an amount or instruct the plant operator to do the same, thereby increasing NHVcz and Vtip_max. At 516, flare combustion controller 52 again can determine whether NHVcz is greater than the lower limit set in the regulation requirements. If NHVcz is still less than 518 the lower limit, flare combustion controller 52 can open 520 fuel valve 38 an additional amount or instruct the plant operator to do the same, thereby further increasing NHVcz and Vtip_max. If NHVcz is greater than 522 the lower limit, flare combustion controller 52 can return to step 328 to determine whether there are any visible emissions emitting from flare stack 12.

Figure 6:
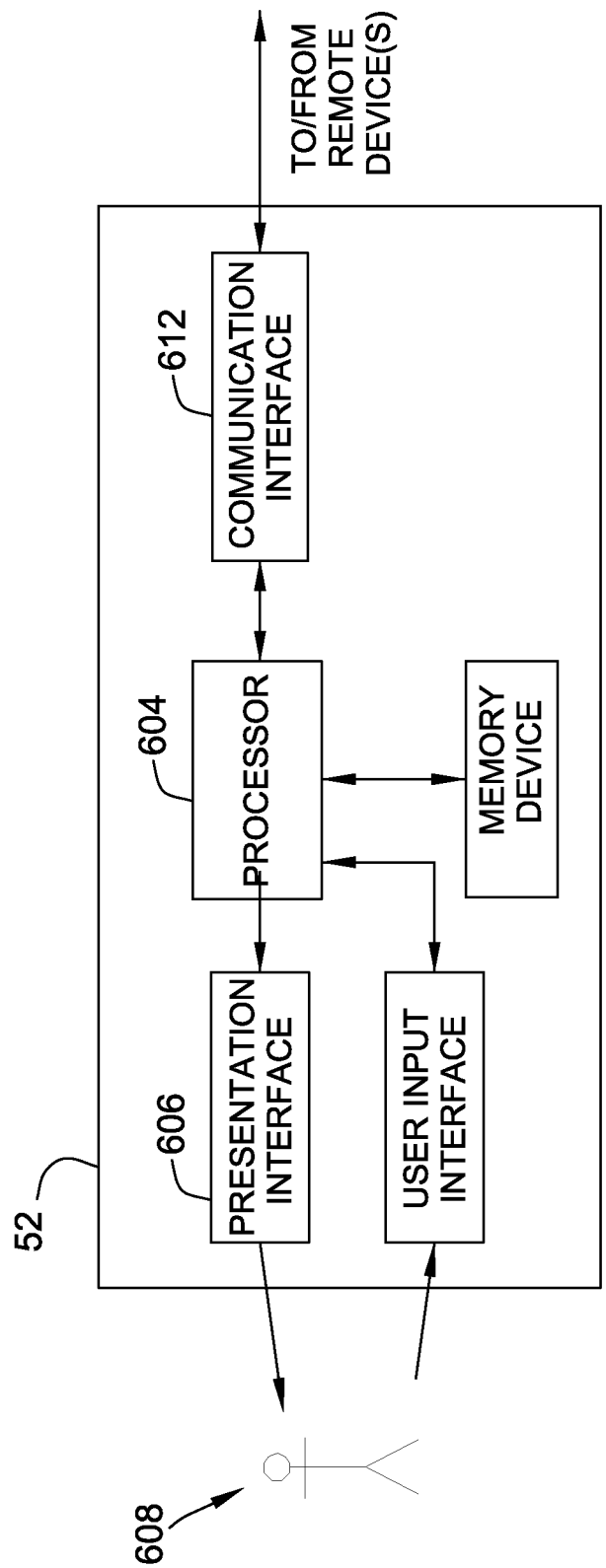
FIG. 6 is a block diagram of the flare combustion controller of FIG. 1.

FIG. 6 is a block diagram of flare combustion controller 52 that may be used to perform monitoring and control of any piece of equipment, system, and process, such as, without limitation, monitoring, and processing of operating parameters of industrial plant 10. In the exemplary embodiment, flare combustion controller 52 can include a memory device 602 and a processor 604 that is coupled to memory device 602. Processor 604 may include one or more processing units, such as, without limitation, a multi-core configuration. In some embodiments, executable instructions can be stored in memory device 602. Flare combustion controller 52 can be configurable to perform one or more operations described herein by programming processor 604. For example, processor 604 may be programmed by encoding an operation as one or more executable instructions and providing the executable instructions in memory device 602. In the exemplary embodiment, memory device 602 can be one or more devices that enable storage and retrieval of information such as executable instructions or other data. Memory device 602 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

As used herein, the term "computer" and related terms, such as, "computing device", are not limited to integrated circuits referred to in the art as a computer, but rather broadly refers to a microcontroller, a microcomputer, a programmable logic controller (PLC), an application specific integrated circuit, and other programmable circuits, and these terms are used interchangeably herein. Furthermore, as used herein, the term "real-time" refers to at least one of the time of occurrence of the associated events, the time of measurement and collection of predetermined data, the time to process the data, and the time of a system response to the events and the environment.

Memory device 602 may be configured to store operational parameters including, without limitation, real-time and historical operational parameter values, or any other type of data. In some embodiments, processor 604 can remove or "purge" data from memory device 602 based on the age of the data. For example, processor 604 may overwrite previously recorded and stored data associated with a subsequent time or event. In addition, or alternatively, processor 604 may remove data that exceeds a predetermined time interval. In addition, memory device 602 can include, without limitation, sufficient data, algorithms, and commands to facilitate monitoring and processing sensor measurements received from sensors coupled to an industrial plant flare system including, without limitation, flare vent gas flowmeter 54, supplemental fuel gas flowmeter 56, and assist gas flowmeter 58.

In some embodiments, flare combustion controller 52 can include a presentation interface 606 coupled to processor 604. Presentation interface 606 can present information, such as a user interface, to a user 608. In one embodiment, presentation interface 606 can include a display adapter (not shown) that is coupled to a display device (not shown), such as a cathode ray tube (CRT), a liquid crystal display (LCD), an organic LED (OLED) display, or an "electronic ink" display. In some embodiments, presentation interface 606 can include one or more display devices. In addition, or alternatively, presentation interface 606 can include an audio output device (not shown), for example, without limitation, an audio adapter, a speaker, or a printer (not shown).

In some embodiments, flare combustion controller 52 can include a user input interface 610. In the exemplary embodiment, user input interface 610 can be coupled to processor 604 and receive input from user 608. User input interface 610 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 606 and user input interface 610.

In the exemplary embodiment, a communication interface 612 can be coupled to processor 604 and can be configured to be coupled in communication with one or more other devices, such as DCS 62, and to perform input and output operations with respect to such devices while performing as an input channel. For example, communication interface 612 may include, without limitation, a wired network adapter, a wireless network adapter, a mobile telecommunications adapter, a serial communication adapter, or a parallel communication adapter. Communication interface 612 may receive a data signal from or transmit a data signal to one or more remote devices, such as flare vent gas flowmeter 54, supplemental fuel gas flowmeter 56, and assist gas flowmeter 58.

Presentation interface 606 and communication interface 612 can both be capable of providing information suitable for use with the methods described herein, such as, providing information to user 608 or processor 604. Accordingly, presentation interface 606 and communication interface 612 may be referred to as output devices. Similarly, user input interface 610 and communication interface 612 can be capable of receiving information suitable for use with the methods described herein and may be referred to as input devices.

In the various embodiments of the present disclosure, portions of the processing operations performed by flare combustion controller 52 can be implemented in the form of an entirely hardware embodiment, an entirely software embodiment, or an embodiment containing both hardware and software elements. In one embodiment, the processing functions performed by flare combustion controller 52 may be implemented in software, which includes but is not limited to firmware, resident software, microcode, etc.

Furthermore, the processing functions performed by flare combustion controller 52 can take the form of a computer program product accessible from a computer-usable or computer-readable medium providing program code for use by or in connection with a computer or any instruction execution system (e.g., processing units). For the purposes of this description, a computer-usable or computer-readable medium can be any computer readable storage medium that can contain or store the program for use by or in connection with the computer or instruction execution system.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

The systems and methods described herein can facilitate controlling the operating parameters of a gas flare, or flare, used in industrial plants to burn flammable gasses. Specifically, the sound speed measurement system can provide an accurate and repeatable flow measurement of the flare gas derived from the sound speed of the measured stream. The sound speed is calculated by a sound speed flowmeter. The sound speed, in combination with a temperature and pressure of the stream, can provide an average molecular weight of the stream. This information can be used by the control system to determine the BTU content of the stream, which can be used for a coarse tuning of the operation of the flare to provide for more efficient flare operation within the periods between the measurement intervals of the GC when the composition of flare vent gas can be subject to fast fluctuations and variances.

The methods and systems described herein are not limited to the specific embodiments described herein. For example, components of each system and/or steps of each method may be utilized independently and separately from other components and/or steps described herein. For example, the method and systems may also be used in combination with other industrial systems, and are not limited to practice only with the flare gas systems described herein. Rather, the exemplary embodiment can be implemented and utilized in connection with many other industrial applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems and methods described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure can be practiced with modification within the spirit and scope of the claims.

What is claimed is:

1. A flare combustion control system comprising:
a sound speed measurement device for measuring sound speed in a flare vent gas flowing within a flare gas conduit, wherein the flare vent gas includes a flare gas flow or a mixture of the flare gas flow and a supplemental fuel gas flow;
a pressure sensor and a temperature sensor, each configured to respectively measure a temperature and pressure of the flare vent gas;
a fuel gas control valve for controlling a flow rate of the supplemental fuel gas flow delivered from a supplemental fuel gas conduit to the flare gas conduit upstream from the sound speed measurement device, wherein the supplemental fuel gas increases a heating value of the flare gas flow;
an assist gas control valve for controlling a flow rate of an assist gas flow delivered by an assist gas conduit to a flare stack proximate a flare tip that receives the flare vent gas from the flare gas conduit, wherein the assist gas decreases a heating value of the flare vent gas; and
a flare combustion controller comprising a memory and a processor, wherein said processor is in communication with the sound speed measurement device, the fuel gas control valve, the assist gas control valve, the temperature sensor, and the pressure sensor and is configured to:
receive the measured sound speed from the sound speed measurement device, a measured temperature of the flare vent gas from the temperature sensor, and a measured pressure of the flare vent gas from the pressure sensor;
determine, based on the measured sound speed, the measured temperature of the flare vent gas, and the measured pressure of the flare vent gas, a molecular weight of the flare vent gas;
determine, based on the determined molecular weight, a measured net heating value of the flare vent gas;
adjust the measured net heating value of the flare vent gas when the measured net heating value is outside of a net heating value operating range between a predetermined net heating value lower limit and a predetermined net heating value upper limit by opening or closing the fuel gas control valve to regulate an amount of the supplemental fuel gas in the flare vent gas;
determine, based upon the flow rate of the assist gas, the flow rate of the fuel gas, and the flow rate of the flare vent gas, a measured assist gas ratio for the flare vent gas; and
adjust the measured assist gas ratio when the measured assist gas ratio is outside of a predetermined assist gas ratio operating range between a predetermined assist gas ratio lower limit and a predetermined assist gas ratio upper limit by opening or closing the assist gas control valve to regulate an amount of the assist gas in the flare vent gas, wherein the assist gas ratio operating range is selected to achieve smokeless combustion of the flare vent gas.

2. The flare combustion control system of claim 1, wherein said processor is further configured to determine the molecular weight of the flare vent gas by iteratively estimating the molecular weight, predicting a sound speed based on the estimated molecular weight, and comparing the predicted sound speed against the measured sound speed.

3. The flare combustion control system of claim 2, wherein said processor is further configured to predict the sound speed based on the estimated molecular weight using virial equations.

4. The flare combustion control system of claim 1, wherein the net heating value determined based on the determined molecular weight is a coarse net heating value determined at coarse tuning intervals, said combustion control system further comprising a gas chromatograph configured to determine, from a sample of the flare vent gas, a fine net heating value at fine tuning intervals, wherein the fine tuning intervals are longer than the coarse tuning intervals.

5. The flare combustion control system of claim 4, wherein the coarse tuning intervals include intervals of at least one of 2 minutes, 1 minute, 30 seconds, 15 seconds, and continuous.

* * * * *